United States Patent
Lee et al.

(10) Patent No.: US 11,816,904 B2
(45) Date of Patent: Nov. 14, 2023

(54) CAMERA FOR VEHICLE AND PARKING ASSISTANCE APPARATUS HAVING THE SAME

(71) Applicant: HYUNDAI MOBIS CO., LTD., Seoul (KR)

(72) Inventors: Won Moo Lee, Yongin-si (KR); Tae Hoon Kang, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 73 days.

(21) Appl. No.: 17/501,913

(22) Filed: Oct. 14, 2021

(65) Prior Publication Data
US 2022/0198202 A1   Jun. 23, 2022

(30) Foreign Application Priority Data

Dec. 21, 2020 (KR) ......................... 10-2020-0179860

(51) Int. Cl.
*G06V 20/58* (2022.01)
*B60R 11/04* (2006.01)
(Continued)

(52) U.S. Cl.
CPC ............ *G06V 20/586* (2022.01); *B60R 11/04* (2013.01); *B60W 50/14* (2013.01); *G06V 20/58* (2022.01);
(Continued)

(58) Field of Classification Search
CPC .......... G08G 1/14; G08G 1/143; G08G 1/146; G08G 1/16; G06K 9/00; G06K 9/00805; G06K 9/00812; G06K 9/00798; G06K 9/46; G06K 9/4632; B60R 11/00; B60R 11/04; B60W 30/00; B60W 30/06; H01L 27/14;
(Continued)

(56) References Cited

U.S. PATENT DOCUMENTS

2015/0185325 A1   7/2015   Park et al.
2015/0205186 A1*  7/2015   Park .................... G02B 7/026
                                                     348/373
(Continued)

FOREIGN PATENT DOCUMENTS

KR        10-1770872        8/2017

OTHER PUBLICATIONS

NPL Search (Feb. 23, 2023).*

*Primary Examiner* — Van T Trieu
(74) *Attorney, Agent, or Firm* — DLA PIPER LLP (US)

(57) ABSTRACT

According to at least one aspect, the present disclosure provides a vehicle camera comprising: a lens module; a circuit board including an image sensor configured to convert light incident through the lens module into an electrical signal; a front housing having the lens module coupled to a front side thereof and the circuit board coupled to a rear side thereof; a rear housing coupled to the rear side of the front housing and provided to surround the circuit board; an outer cover configured to surround at least a portion of the lens module, the outer cover including one or more infrared passing portions; and a depth camera module included inside the outer cover and coupled to the front side of the front housing, the depth camera module being configured to capture an image for detecting an obstacle around the vehicle using the infrared passing portion.

16 Claims, 7 Drawing Sheets

(51) Int. Cl.
 *H04N 5/33* (2023.01)
 *B60W 50/14* (2020.01)
 *G08G 1/14* (2006.01)
 *B60R 11/00* (2006.01)
 *H04N 23/51* (2023.01)
 *H04N 23/52* (2023.01)

(52) U.S. Cl.
 CPC .............. *G08G 1/14* (2013.01); *G08G 1/146* (2013.01); *H04N 5/33* (2013.01); *B60R 2011/004* (2013.01); *B60R 2300/103* (2013.01); *B60R 2300/105* (2013.01); *B60R 2300/806* (2013.01); *B60R 2300/8093* (2013.01); *B60W 2050/143* (2013.01); *B60W 2050/146* (2013.01); *H04N 23/51* (2023.01); *H04N 23/52* (2023.01)

(58) Field of Classification Search
 CPC ..... H01L 27/146; H01S 13/86; H01S 13/865; H01S 13/867; H04N 5/22; H04N 5/225; H04N 5/33; H04W 4/00; H04W 4/025
 See application file for complete search history.

(56) References Cited

U.S. PATENT DOCUMENTS

| | | | |
|---|---|---|---|
| 2016/0048733 A1* | 2/2016 | Jung | G06T 3/0093 |
| | | | 382/104 |
| 2016/0231133 A1* | 8/2016 | Johnson | G01C 21/36 |
| 2019/0061621 A1* | 2/2019 | Chae | H04N 23/62 |
| 2020/0294310 A1* | 9/2020 | Lee | G06T 7/13 |
| 2021/0124035 A1* | 4/2021 | Chun | G01S 13/86 |
| 2022/0050358 A1* | 2/2022 | Chang | G03B 30/00 |

* cited by examiner

FIG. 7

CAMERA FOR VEHICLE AND PARKING ASSISTANCE APPARATUS HAVING THE SAME

CROSS-REFERENCE TO RELATED APPLICATION

This application claims priority to and the benefit of Korean Patent Application No. 10-2020-0179860, filed on Dec. 21, 2020, the disclosure of which is incorporated herein by reference in its entirety.

BACKGROUND

Field of the Invention

The present disclosure relates to a vehicle camera and a parking assistance apparatus including the same. More particularly, the present disclosure relates to a vehicle camera using a depth camera, and a parking assistance apparatus including the same.

Discussion of Related Art

The content described in this section merely provides background information about the present disclosure and does not constitute the related art.

In order to increase the safety and convenience of drivers who use vehicles, the development of technologies for applying various sensors and electronic devices to vehicles are being accelerated. Accordingly, autonomous driving is possible in which a vehicle can autonomously travel on a road without the intervention of a driver.

Meanwhile, in autonomous driving, there is an increasing interest in automatic parking technologies for automatically performing parking which is difficult for a considerable number of drivers. In general, in order to support automatic parking, an image of a camera or an ultrasonic wave sensor is used to search for an available parking space around a vehicle, and a driver is guided to the found available parking space.

In the case of using the ultrasonic sensor, a method is used in which an inter-vehicle distance is measured from a round trip time taken for emitted ultrasonic waves to be returned by colliding the ultrasonic waves and an object. In the case of using the image of the camera, a method is used in which a parking space is recognized based on surround views from a plurality of cameras for photographing surroundings of a vehicle.

However, in the case of automatic parking using ultrasonic waves, the inter-vehicle distance can be easily measured, but it is difficult to accurately recognize a line, resulting in difficulty in correct parking. In addition, even in the case of automatic parking using the image of the camera, since a space is detected based on a two-dimension (2D), when a three-dimensional (3D) obstacle is present in a parking space, there is a problem in that it is difficult to detect the 3D obstacle.

SUMMARY OF THE INVENTION

The present disclosure is directed to providing a vehicle camera which recognizes a parking space and detects obstacles in a parking space more accurately using a depth camera while using an existing camera mounting space of a vehicle without change, and a parking assistance apparatus including the same.

According to at least one aspect, the present disclosure provides A vehicle camera comprising: a lens module in which a plurality of lenses are assembled in a lens barrel; a circuit board including an image sensor configured to convert light incident through the lens module into an electrical signal; a front housing having the lens module coupled to a front side thereof and the circuit board coupled to a rear side thereof; a rear housing coupled to the rear side of the front housing and provided to surround the circuit board; an outer cover formed as a hollow type and configured to surround at least a portion of the lens module, the outer cover including one or more infrared passing portions configured to allow infrared light to pass therethrough; and a depth camera module included inside the outer cover and coupled to the front side of the front housing, the depth camera module being configured to capture an image including information about a distance from a photographed object surface for detecting an obstacle around the vehicle using the infrared passing portion.

According to another aspect, the present disclosure provides a vehicle comprising the vehicle camera of claim 1 which is mounted on at least one of a side mirror, a radiator grill, or a trunk lid of the vehicle.

According to another aspect, the present disclosure provides a parking assistance apparatus using a vehicle camera, comprising: a plurality of wide angle cameras mounted on a vehicle and configured to photograph a space around the vehicle; a plurality of depth cameras mounted on the vehicle and configured to capture an image including information about a distance from a photographed object surface around the vehicle; and at least one circuit configured to: identify parking lines based on a surround view image acquired from the plurality of wide angle cameras and to detect a parking space around the vehicle; detect an obstacle around the vehicle based on the depth image of the parking space captured by the plurality of depth cameras; and determine whether parking of the vehicle is allowed based on a size of the parking space and whether the obstacle is detected.

According to the present embodiment, by using an existing camera mounting space of a vehicle without change, a parking space can be recognized, and obstacles in a parking space can be detected more accurately, thereby assisting in parking.

| REFERNCE NUMERICALS | |
|---|---|
| 10: vehicle camera | 100: outer cover |
| 105: infrared passing portion | 110: lens module |
| 120: first waterproof member | 130: second waterproof met |
| 140: depth camera module | 142: infrared lighting unit |
| 144: infrared receiving unit | 150: connector |
| 160: front housing | 170: image sensor |
| 180: circuit board | 190: rear housing |
| 300: input-output terminal | 400: side mirror |
| 500: radiator grill | 600: trunk |
| 700: wide angle camera | 710: depth camera |
| 720: surround view generation unit | 730: depth map generation |
| 740: parking space detection unit | 742: contour extraction unit |
| 744: parking line detection unit | 750: obstacle detection unit |
| 752: histogram calculation unit | 754: pixel comparison unit |
| 760: parking availability determining unit | 770: display unit |
| 780: alarm unit | |

DETAILED DESCRIPTION OF EXEMPLARY EMBODIMENTS

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
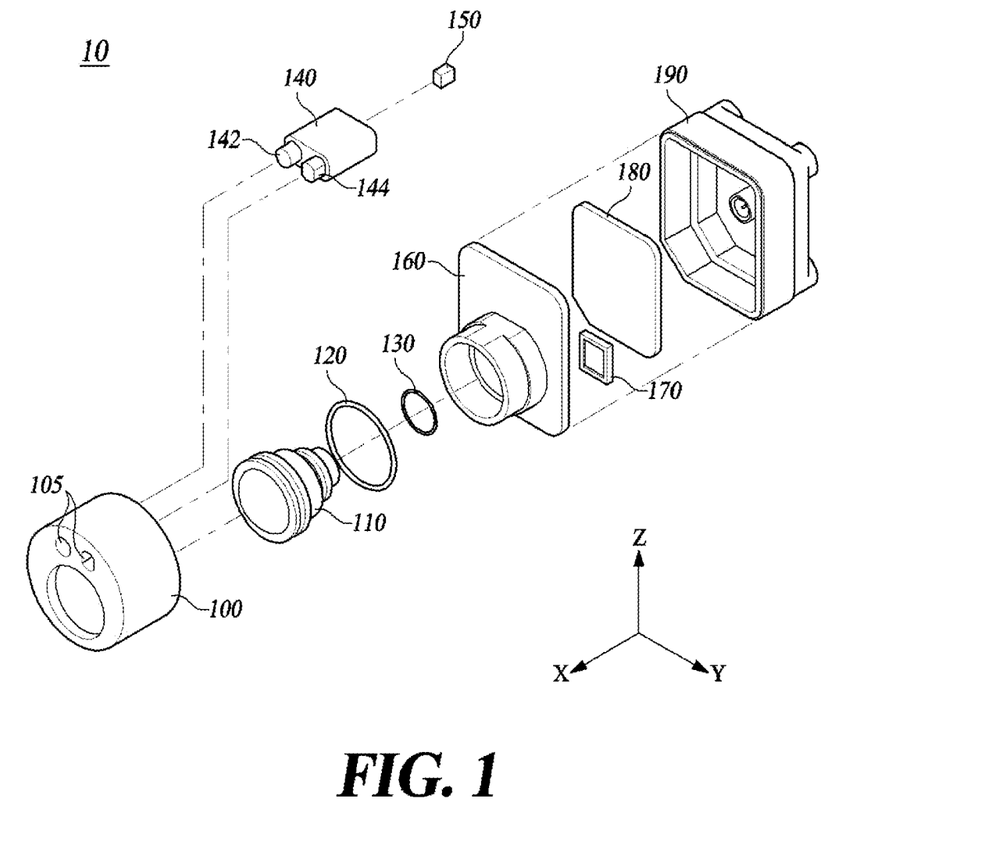
FIG. 1 is an exploded perspective view of a vehicle camera according to one embodiment of the present disclosure.

FIG. 1 is an exploded perspective view of a vehicle camera according to one embodiment of the present disclosure.

Figure 2:
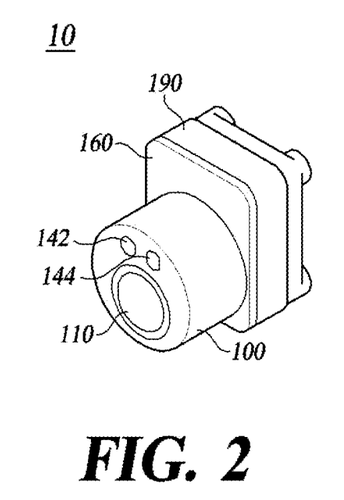
FIG. 2 is an assembled perspective view of the vehicle camera according to one embodiment of the present disclosure.

FIG. 2 is an assembled perspective view of the vehicle camera according to one embodiment of the present disclosure.

Figure 3:
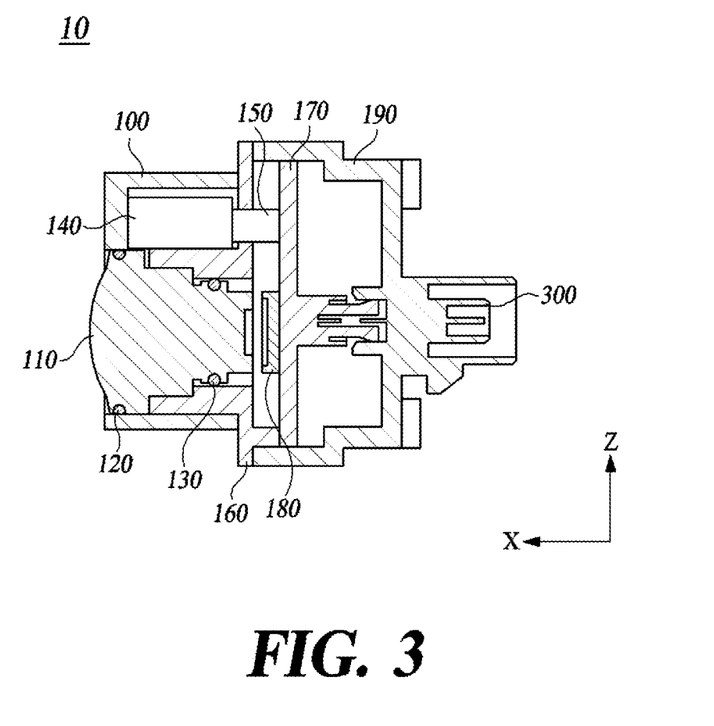
FIG. 3 is a cross-sectional view of the vehicle camera according to one embodiment of the present disclosure.

FIG. 3 is a cross-sectional view of the vehicle camera according to one embodiment of the present disclosure.

Referring to FIGS. 1 to 3, a vehicle camera 10 according to one embodiment of the present disclosure includes all or some of a lens module 110, a circuit board 180, a front housing 160, a rear housing 190, an outer cover 100, a depth camera module 140, a connector 150, a first waterproof member 120, and a second waterproof member 130.

The lens module 110 refers to a lens module in which a plurality of lenses (not shown) are assembled in a lens barrel (not shown). In this case, the plurality of lenses may be previously assembled in the lens barrel. In addition, the plurality of lenses included in the lens module 110 may be provided as wide angle lenses having an angle of view of 60° or more.

The plurality of lenses may include a first lens group (not shown) disposed at a front side and a second lens group (not shown) disposed at a rear side, and in this case, an optical axis of the first lens group may match an optical axis of the second lens group. Meanwhile, here, in FIG. 1, the term "front" refers to an X-axis direction, and the term "rear" refers to a direction opposite to the front. The same applies to the following.

When the plurality of lenses include the first lens group and the second lens group, for example, the first lens group may be moved with respect to the second lens group to change an angle of view of the camera. However, the plurality of lenses do not necessarily include the first lens group and the second lens group.

The circuit board 180 includes an image sensor 170. The image sensor 170 may be mounted on the circuit board 180 but may be disposed independently of the circuit board 180 and connected thereto through a circuit. The image sensor 170 is configured to convert light incident through the lens module 110 into an electrical signal. Meanwhile, the circuit board 180 may include a plurality of layers, and various data lines and via holes (not shown) for connecting the layers may be formed in an area in which the image sensor 170 is mounted.

The front housing 160 is provided such that the lens module 110 is assembled to a front side thereof and the circuit board 180 is assembled to a rear side thereof. In order to assemble the lens module 110 to the front side of the front housing 160, a male screw may be formed on an outer circumferential surface of the lens module 110, and a female screw may be formed in an inner circumferential surface of the front housing 160 so that the male screw and the female may be screw-coupled. However, a coupling method is not necessarily limited thereto.

The rear housing 190 may be coupled to the rear side of the front housing 160 to surround the circuit board 180, thereby protecting the circuit board 180 and internal components. In addition, the rear housing 190 may include at least one input-output terminal 300, and the input-output terminal 300 may be used to receive power and transmit and receive various electrical signals.

The outer cover 100 is formed as a hollow type to surround at least a portion of the lens module 110 and includes one or more infrared passing portions 105 configured to allow infrared light to pass therethrough. Since the outer cover 100 is formed as the hollow type, the lens module 110 may photograph a front view, and the depth camera module 140 to be described below may also be included therein.

In addition, the outer cover 100 may be coupled to the front side of the front housing 160. Accordingly, when viewed from front to rear, the outer cover 100, the front housing 160, and the rear housing 190 may be coupled in this order.

When the outer cover 100, the front housing 160, and the rear housing 190 are made of a plastic material, the front housing 160 and the rear housing 190, and the front housing 160 and the outer cover 100 may be fusion-coupled using ultrasonic waves or lasers. On the other hand, when the outer cover 100, the front housing 160, and the rear housing 190 are made of a metal material, the front housing 160 and the rear housing 190, and the front housing 160 and the outer cover 100 may be welded and coupled using lasers. Referring to FIG. 3, portions which are coupled described above may be contact surfaces of the front housing 160 and the rear housing 190 and contact surfaces of the front housing 160 and the outer cover 100.

Meanwhile, when viewed from the front, the outer cover 100 may have a perfect circular shape and thus may be mounted on a portion on which an existing vehicle camera is mounted. However, a front shape of the outer cover 100 is not necessarily the perfect circular shape and may be transformed according to a portion of a vehicle on which the outer cover 100 is mounted.

The depth camera module 140 is included inside the outer cover 100, assembled to the front side of the front housing 160, and configured to capture a depth image (depth map) for detecting an obstacle around the vehicle using the infrared passing portion 105. Therefore, the depth camera module 140 may be disposed to face a front direction.

The depth camera module 140 may be provided as, for example, a time-of-flight (TOF) camera. The TOF camera may measure a distance to an object to be photographed by calculating a time for infrared light to be irradiated onto an object and then is received by returning due to reflection by the object. Since the depth camera module 140 captures a depth image using infrared light, unlike a general camera, an obstacle can be detected even at night. In addition, as compared with a case in which an obstacle is detected using ultrasonic waves, an obstacle detection distance can be much longer, and the size and position of the obstacle can be detected more accurately.

When the depth camera module 140 is provided as the TOF camera, the depth camera module 140 may include an infrared lighting unit 142 and an infrared receiving unit 144.

The infrared lighting unit 142 is configured to irradiate infrared light. In this case, infrared light may be irradiated in the front direction. In addition, the infrared lighting unit 142 may be provided as an infrared light-emitting diode (LED), but the present disclosure is not necessarily limited thereto as long as infrared light can be irradiated. Meanwhile, infrared light irradiated from the infrared lighting unit 142 may have a wavelength of about 940 nm in order to reduce interference from sunlight, but the present disclosure is not necessarily limited thereto.

The infrared receiving unit 144 is configured to receive infrared light that is irradiated from the infrared lighting unit 142 and reflected and returned by colliding the irradiated infrared light and an object. The infrared receiving unit 144 may generate an electrical signal when receiving infrared light, and accordingly, it is possible to measure a time until infrared light returns to the infrared receiving unit 144 after being irradiated from the infrared lighting unit 142.

By using the infrared lighting unit 142 and the infrared receiving unit 144, a depth image acquired from the depth camera module 140 may represent an image including information about a distance from a photographed object surface. For example, a surface close to the depth camera module 140 is expressed in a bright color, and a surface far away from the depth camera module 140 is expressed in a dark color, thereby showing distance information. Accordingly, it is possible to easily detect an obstacle around the vehicle and a distance to the obstacle using the depth camera module 140.

Meanwhile, the infrared passing portion 105 provided in the outer cover 100 may be disposed on a front side of the infrared lighting unit 142 and the infrared receiving unit 144 of the depth camera module 140. In this case, as shown in FIG. 1, one or two infrared passing portions 105 may be provided in a shape of a through-hole or the like.

As shown in FIG. 1, when the two infrared passing portions 105 are provided, each of the infrared passing portions 105 may be disposed to correspond to one of positions of the infrared lighting unit 142 and the infrared receiving unit 144. Accordingly, the depth camera module 140 may irradiate and receive infrared light using the infrared passing portion 105 inside the outer cover 100.

The connector 150 electrically connects the depth camera module 140 and the circuit board 180 and is configured to fix the position of the depth camera module 140. By using the connector 150, a depth image captured by the depth camera module 140 may be transmitted to the circuit board 180, and the depth camera module 140 may be prevented from being moved inside the outer cover 100.

The first waterproof member 120 is provided such that a space between the lens module 110 and the outer cover 100, which are assembled, is watertight. The second waterproof member 130 is provided such that a space between the lens module 110 and the front housing 160, which are assembled, is watertight.

The first waterproof member 120 is compressed when the lens module 110 and the outer cover 100 are assembled, and the second waterproof member 130 is compressed when the lens module 110 and the front housing 160 are assembled. Since the first waterproof member 120 and the second waterproof member 130 are compressed at the same time when being assembled, a space between the first waterproof member 120 and the second waterproof member 130, which are assembled, can be watertight, that is, a fluid can be prevented from leaking into or from the space. Meanwhile, the first waterproof member 120 and the second waterproof member 130 may be, for example, O-rings or gaskets but are not necessarily limited thereto.

The vehicle camera 10 according to one embodiment of the present disclosure has such a configuration so that a wide angle camera and a depth camera are integrally formed as one module. Therefore, the vehicle camera 10 according to one embodiment of the present disclosure can not only detect a parking space around a vehicle using the wide angle camera but also more accurately detect an obstacle in a space around the vehicle using the depth camera. Hereinafter, examples will be described in which the vehicle camera 10 according to one embodiment of the present disclosure is mounted on the vehicle.

Figure 4:
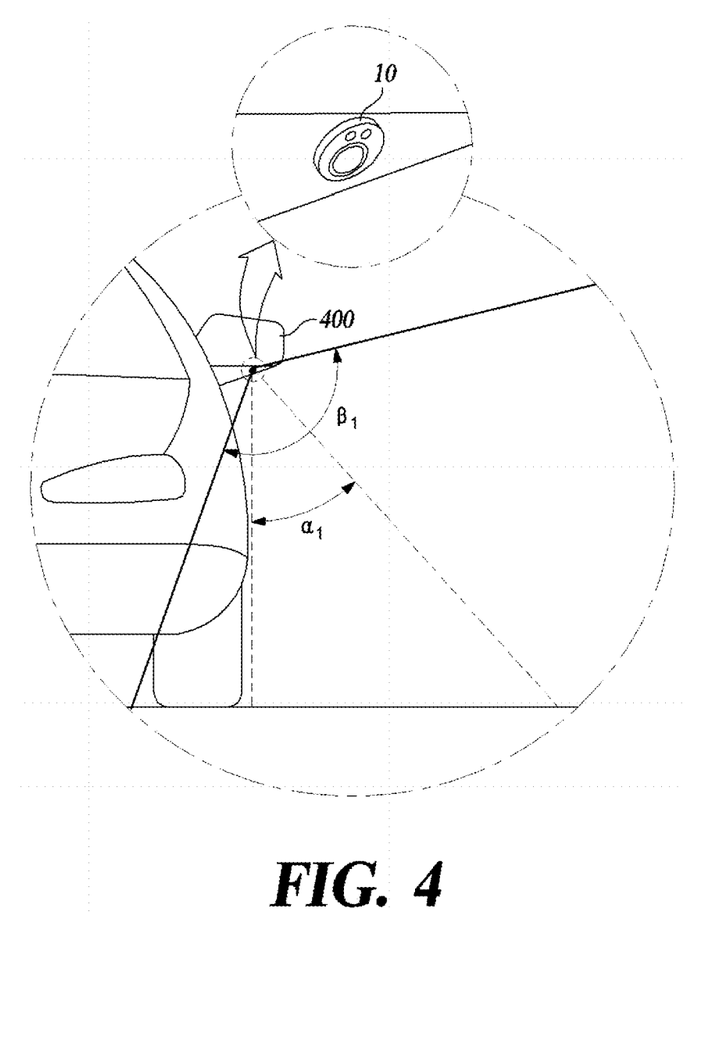
FIG. 4 is a view illustrating an example in which the vehicle camera according to one embodiment of the present disclosure is mounted on a side mirror.

FIG. 4 is a view illustrating an example in which the vehicle camera according to one embodiment of the present disclosure is mounted on a side mirror.

Figure 5:
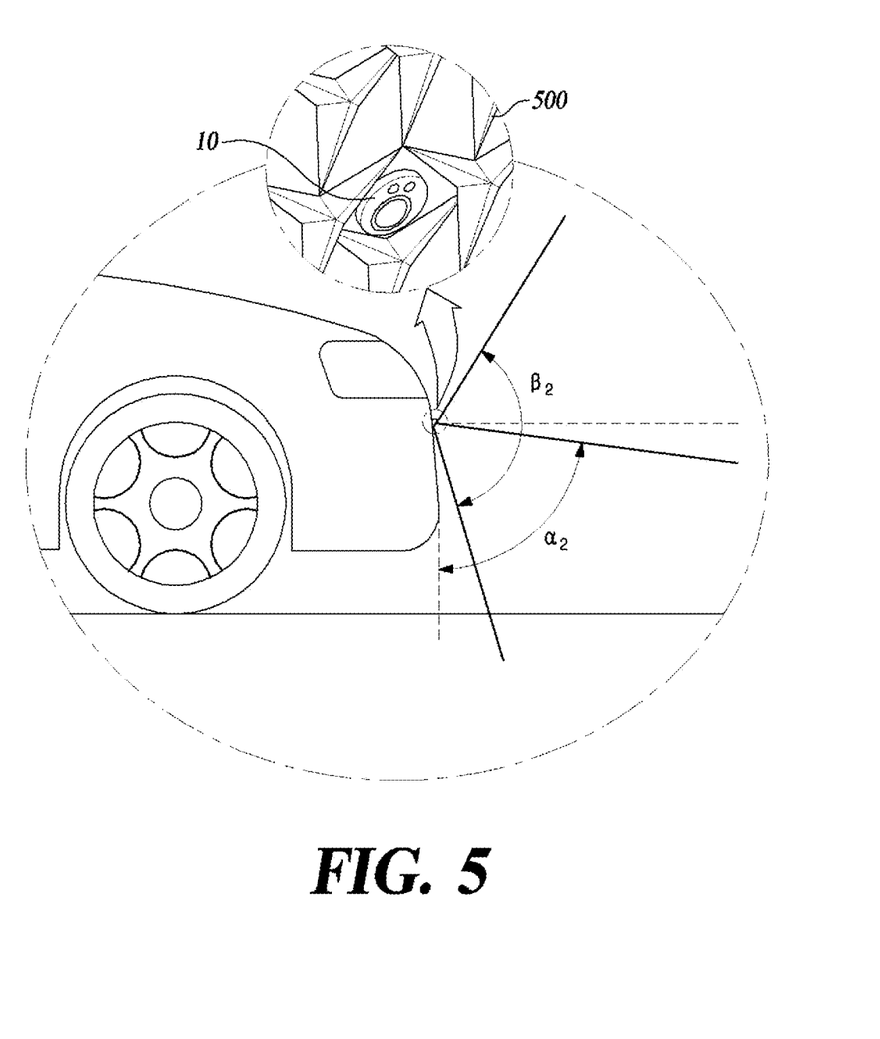
FIG. 5 is a view illustrating an example in which the vehicle camera according to one embodiment of the present disclosure is mounted on a radiator grill.

FIG. 5 is a view illustrating an example in which the vehicle camera according to one embodiment of the present disclosure is mounted on a radiator grill.

Figure 6:
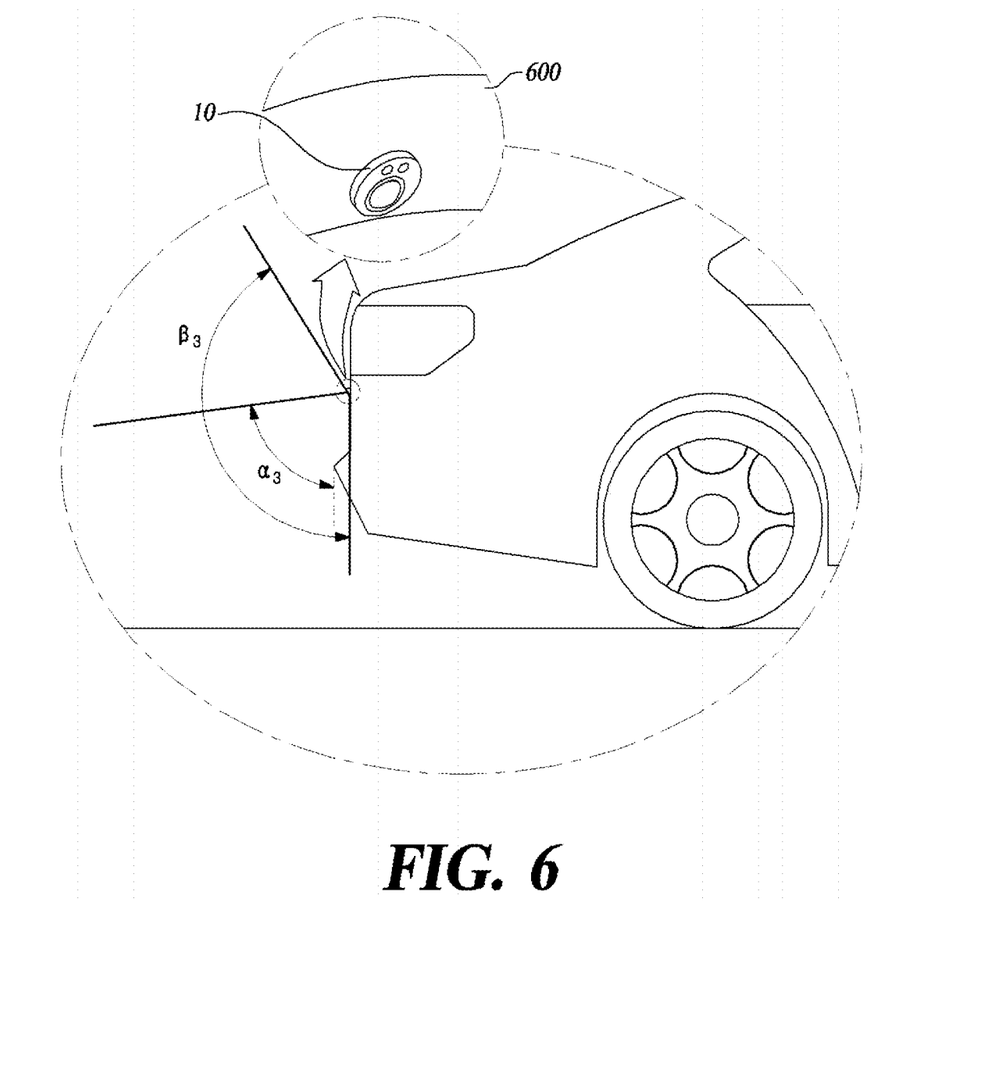
FIG. 6 is a view illustrating an example in which the vehicle camera according to one embodiment of the present disclosure is mounted on a trunk lid.

FIG. 6 is a view illustrating an example in which the vehicle camera according to one embodiment of the present disclosure is mounted on a trunk lid.

Referring to FIG. 4, the vehicle camera 10 according to one embodiment of the present disclosure may be mounted at a lower portion of a side mirror 400 in a vehicle. In this case, the vehicle camera 10 according to one embodiment of the present disclosure may have a beam angle $\alpha 1$ of about 45° and a vertical angle of view $\beta 1$ of 30° to 160°.

Referring to FIG. 5, the vehicle camera 10 according to one embodiment of the present disclosure may be mounted in an empty space of a radiator grill 500 in the vehicle. In this case, the vehicle camera 10 according to one embodiment of the present disclosure may have a beam angle $\alpha 2$ of about 75° and a vertical angle of view $\beta 2$ of 138° to 160°.

Referring to FIG. 6, the vehicle camera 10 according to one embodiment of the present disclosure may be mounted on a lid of a trunk 600 of the vehicle. In this case, the vehicle camera 10 according to one embodiment of the present disclosure may have a beam angle $\alpha 3$ of about 75° and a vertical angle of view $\beta 3$ of 138° to 160°.

As described above, the vehicle camera 10 according to one embodiment of the present disclosure can be mounted without changing and transforming an existing portion of a vehicle on which a wide angle camera is disposed, and thus, additional costs can not be consumed.

Figure 7:
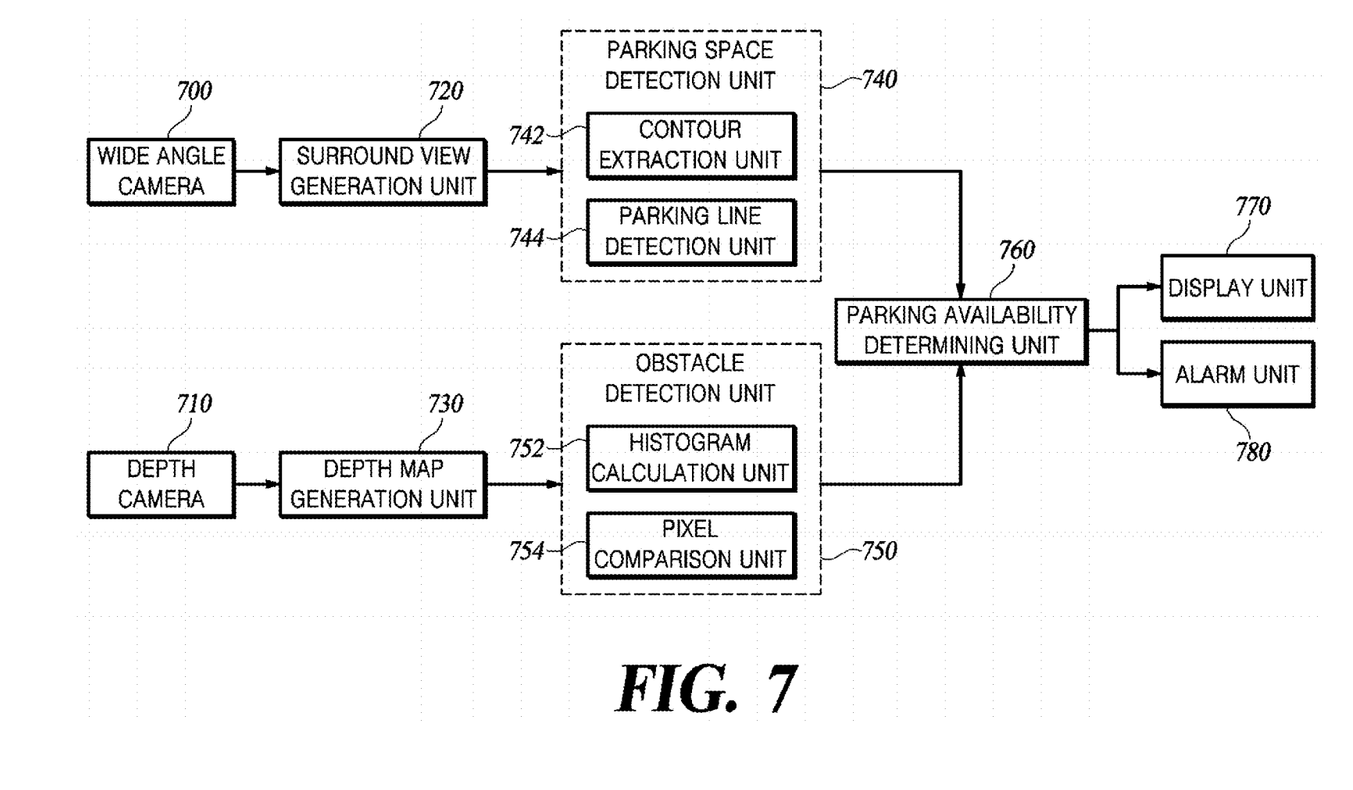
FIG. 7 is a block diagram of a parking assistance apparatus according to one embodiment of the present disclosure.

FIG. 7 is a block diagram of a parking assistance apparatus according to one embodiment of the present disclosure.

Referring to FIG. 7, the parking assistance apparatus according to one embodiment of the present disclosure includes all or some of a wide angle camera 700, a depth camera 710, a surround view generation unit 720, a depth map generation unit 730, a parking space detection unit 740, an obstacle detection unit 750, a parking availability determining unit 760, a display unit 770, and an alarm unit 780. The surround view generation unit 720, depth map generation unit 730, parking space detection unit 740, obstacle detection unit 750, parking availability determining unit 760, display unit 770, and alarm unit 780 may be embodied as one or more processors and/or other circuits configured to execute the processes described herein, for example by executing instructions stored in non-transitory memory.

Each element of the parking assistance apparatus may be implemented in hardware or software, or a combination of hardware and software. The functions of the respective elements may be implemented as software or circuit, and a microprocessor may be implemented to execute the software functions or the circuit functions corresponding to the respective elements.

The wide angle camera 700 is mounted on a vehicle and configured to photograph a space around the vehicle. A plurality of wide angle cameras 700 may be provided and mounted on the vehicle. The plurality of wide angle cameras 700 may photograph a space around the vehicle, thereby detecting a parking space.

The wide angle camera 700 may include a lens module 110 (see FIG. 1) and a circuit board 180 (see FIG. 1), and the lens module refers to a lens module in which a plurality of lenses (not shown) are assembled in a lens barrel (not shown). Meanwhile, the circuit board may include an image sensor 170 (see FIG. 1) configured to convert light incident through the lens module into an electrical signal.

The depth camera 710 is mounted on the vehicle and configured to capture a depth image around the vehicle. A plurality of depth cameras 710 may be provided and mounted on the vehicle. The plurality of depth cameras 710 may capture a depth image around the vehicle to detect an obstacle.

The depth camera 710 may be provided as, for example, a TOF camera. The TOF camera may measure a distance to an object to be photographed by calculating a time for infrared light to be irradiated onto an object and then received by returning due to reflection by the object. Since the depth camera 710 captures a depth image using infrared light, unlike a general camera, an obstacle can be detected even at night. In addition, as compared with a case in which an obstacle is detected using ultrasonic waves, an obstacle detection distance can be much longer, and the size and position of the obstacle can be detected more accurately.

When the depth camera 710 is provided as the TOF camera, the depth camera 710 may include an infrared lighting unit 142 (see FIG. 1) and an infrared receiving unit 144 (see FIG. 1).

The infrared lighting unit 142 is configured to irradiate infrared light. In this case, infrared light may be irradiated in a front direction. The infrared lighting unit 142 may be provided as an infrared LED, but the present disclosure is not necessarily limited thereto as long as infrared light can be irradiated. Meanwhile, infrared light irradiated from the infrared lighting unit 142 may have a wavelength of about 940 nm in order to reduce interference from sunlight, but the present disclosure is not necessarily limited thereto.

The infrared receiving unit 144 is configured to receive infrared light that is irradiated from the infrared lighting unit 142 and reflected and returned by colliding the irradiated infrared light and an object. The infrared receiving unit 144 may generate an electrical signal when receiving infrared light, and accordingly, it is possible to measure a time until infrared light returns to the infrared receiving unit 144 after being irradiated from the infrared lighting unit 142.

Meanwhile, as shown in FIG. 2, the depth camera 710 and the wide angle camera 700 may be integrally formed as one module. In this case, the module including the depth camera 710 and the wide angle camera 700 may be mounted on, for example, a side mirror of a vehicle, a radiator grill, a trunk lid, or the like. In this case, the module including the depth camera 710 and the wide angle camera 700 may be provided to be mounted on a portion, on which an existing vehicle camera is mounted, without change.

The surround view generation unit 720 generates a surround view image by mixing images captured by the plurality of wide angle cameras 700 and performing signal processing thereon. The plurality of wide angle cameras 700 may each be mounted on the mirror, the radiator grille, the trunk lid, or the like in the vehicle. In this case, the surround view image may be an image corresponding to a virtual viewpoint, for example, a viewpoint when the vehicle is viewed from above.

The depth map generation unit 730 generates a depth image, which is a three-dimensional (3D) stereoscopic image, using an image captured by the depth camera 710. The depth image may represent an image including information about a distance from a photographed object surface. For example, a surface close to the depth camera 710 is expressed in a bright color, and a surface far away from the depth camera 710 is expressed in a dark color, thereby showing distance information. Accordingly, it is possible to easily detect an obstacle around the vehicle and a distance to the obstacle using the depth camera 710. In addition, the depth camera 710 may be used to detect an obstacle as well as the presence or absence of a sink hole.

The parking space detection unit 740 detects a parking space around the vehicle by identifying parking lines based on a surround view image acquired from the plurality of wide angle cameras 700. Here, the parking space refers to a rectangular space present on a ground surface, and the rectangular space refers to a space inside the parking lines. In this case, the parking lines may be identified inside the surround view image, and then, the rectangular space may be detected based on four points at which the identified parking lines intersect each other.

In order to detect the parking space, the parking space detection unit 740 may include a contour extraction unit 742 and a parking line detection unit 744.

In addition, although not shown in FIG. 7, the parking space detection unit 740 may further include a distortion correction unit (not shown) for correcting a curve, which may look distorted in a process of converting a 3D stereoscopic image into a two-dimensional (2D) image, into a straight line.

The contour extraction unit 742 extracts a contour line of a parking space. For example, contours of a vehicle and a parking line may be extracted from an image corrected by the distortion correction unit using, for example, a Canny edge detection method.

The parking line detection unit 744 identifies parking lines by applying, for example, a Hough transform to the inside of the contour line extracted by the contour extraction unit 742. The Hough transform is one of algorithms for finding a straight line in an image. By using the Hough transform, a straight line inside a contour line may be extracted, and the extracted straight line may be identified as a parking line.

The obstacle detection unit 750 detects an obstacle around the vehicle based on a depth image in the parking space acquired from the plurality of depth cameras 710. That is, when an obstacle is present inside the parking space detected by the parking space detection unit 740, in the depth image, a color of a portion with the obstacle is differently expressed from that of a surrounding, and the obstacle detection unit 750 may detect the presence or absence of the obstacle in the parking space on the basis thereof. In addition, the obstacle detection unit 750 may detect the presence or absence of a sink hole in the same manner as described above.

In order to detect an obstacle, the obstacle detection unit 750 may include a histogram calculation unit 752 and a pixel comparison unit 754.

The histogram calculation unit 752 calculates a histogram for the depth image in the parking space. For example, the histogram calculation unit 752 may divide the parking space at regular intervals to calculate a histogram of pixel values for each divided area and calculate a difference in histogram between the divided areas. Based on the difference in histogram, the obstacle detection unit 750 may detect an obstacle present in the parking space.

The pixel comparison unit 754 compares a similarity between adjacent pixels using vertical and horizontal scanning on the depth image in the parking space. For example, when an obstacle is present in the depth image, there may be a large difference between an adjacent pixel and a pixel in an area with the obstacle, and the large difference may be recognized by scanning pixel values vertically and horizontally. Accordingly, the obstacle detection unit 750 may detect an obstacle in the parking space based on the similarity between the adjacent pixels.

The parking availability determining unit 760 determines whether parking of the vehicle is possible based on a size of the parking space and whether an obstacle is detected.

The parking availability determining unit 760 first determines whether the size of the parking space detected by the parking space detection unit 740 is a size in which parking of the vehicle is possible. Accordingly, the parking availability determining unit 760 may store information about a size of a vehicle in which a driver rides, and thus, when a rectangular parking space detected by the parking space detection unit 740 is not sufficiently large as compared with the size of the vehicle, the parking availability determining unit 760 may determine that parking is impossible.

In addition, the parking availability determining unit 760 may determine whether the detected parking space is an area, in which parking is possible, according to whether the obstacle detection unit 750 detects an obstacle. For example, even when a size of a parking space is sufficiently large as compared with a size of a vehicle to be parked, when an obstacle or a sink hole is present in the parking space, parking may be impossible. In this case, the parking availability determining unit 760 may determine that the parking space is an area in which parking is impossible.

However, even when an obstacle and/or a sink hole is detected by the obstacle detection unit 750, when the obstacle and/or the sink hole is positioned, for example, at an edge of the parking space, and a sufficient parking space is secured despite the presence of the obstacle and/or the sinkhole, the parking availability determining unit 760 may determine that the parking space is an area in which parking is impossible. In this case, the position of the obstacle and/or the sink hole may be determined based on the calculation and comparison of the histogram calculation unit 752 and the pixel comparison unit 754.

The display unit 770 is provided inside the vehicle, and when the parking availability determining unit 760 determines that parking is possible, the display unit 770 is configured to provide a parking availability display to the driver. The display unit 770 may be provided in a cluster, a center fascia, or the like in the vehicle, but the present disclosure is not necessarily limited to such a position as long as a driver can see a parking available display.

The alarm unit 780 is provided inside the vehicle, and when the parking availability determining unit 760 determines that parking is possible, the alarm unit 780 is configured to sound a parking availability alarm to the driver.

The parking assistance apparatus according to one embodiment of the present disclosure may use a vehicle camera and have such a configuration to detect obstacles in a parking space and also recognize a parking space more accurately, thereby assisting in parking.

As described above, according to the present embodiment, by using an existing camera mounting space of a vehicle without change, a parking space can be recognized, and obstacles in a parking space can be detected more accurately, thereby assisting in parking.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A vehicle camera comprising:
  a lens module in which a plurality of lenses are assembled in a lens barrel;
  a circuit board including an image sensor configured to convert light incident through the lens module into an electrical signal;
  a front housing having the lens module coupled to a front side thereof and the circuit board coupled to a rear side thereof;
  a rear housing coupled to the rear side of the front housing and provided to surround the circuit board;
  an outer cover formed as a hollow type and configured to surround at least a portion of the lens module, the outer cover including one or more infrared passing portions configured to allow infrared light to pass therethrough; and
  a depth camera module included inside the outer cover and coupled to the front side of the front housing, the depth camera module being configured to capture an image including information about a distance from a photographed object surface for detecting an obstacle around the vehicle using the infrared passing portion,
  wherein the one or more infrared passing portions are opened so that at least a portion of the depth camera module is exposed to the outside, and wherein at least the portion of the depth camera module is configured to be inserted into the one or more infrared passing portions.

2. The vehicle camera of claim 1, further comprising a connector configured to electrically connect the depth camera module and the circuit board and configured to fix a position of the depth camera module.

3. The vehicle camera of claim 1, further comprising a first waterproof member configured to form a watertight space between the lens module and the outer cover.

4. The vehicle camera of claim 1, further comprising a second waterproof member configured to form a watertight space between the lens module and the front housing.

5. The vehicle camera of claim 1, wherein the depth camera module includes:
an infrared lighting unit configured to irradiate infrared light; and
an infrared receiving unit configured to receive infrared light that is reflected and returned by colliding the irradiated infrared light and an object.

6. The vehicle camera of claim 5, wherein the infrared passing portion is provided as two infrared passing portions, and
each of the two infrared passing portions is disposed to correspond to one of positions of the infrared lighting unit and the infrared receiving unit.

7. The vehicle camera of claim 1, wherein the front housing, the rear housing, and the outer cover are made of a plastic material, and
the front housing and the rear housing, and the front housing and the outer cover, are respectively fusion-coupled using ultrasonic waves or lasers.

8. The vehicle camera of claim 1, wherein the front housing, the rear housing, and portions of the outer cover separate from the one or more infrared passing portions are made of a metal material, and
the front housing and the rear housing, and the front housing and the outer cover, are respectively welded and coupled using lasers.

9. A vehicle comprising the vehicle camera of claim 1 which is mounted on at least one of a side mirror, a radiator grill, or a trunk lid of the vehicle.

10. A parking assistance apparatus using a vehicle camera, comprising:
a plurality of wide angle cameras mounted on a vehicle and configured to photograph a space around the vehicle;
a plurality of depth cameras mounted on the vehicle and configured to capture an image including information about a distance from a photographed object surface around the vehicle; and
at least one circuit configured to:
identify parking lines based on a surround view image acquired from the plurality of wide angle cameras and to detect a parking space around the vehicle;
detect an obstacle around the vehicle based on the depth image of the parking space captured by the plurality of depth cameras; and
determine whether parking of the vehicle is allowed by:
determining whether a size of the parking space is an acceptable size large enough to park the vehicle,
comparing the obstacle to the size of the parking space to determine an amount the obstacle decreases the size of the parking space, and
determining that parking of the vehicle is allowed when the comparison indicates that the amount does not decrease the size of the parking space to be less than the acceptable size.

11. The parking assistance apparatus of claim 10, wherein the at least one circuit is configured to identify the parking lines by:
extracting a contour line of the parking space; and
identifying the parking lines by applying a Hough transform to an inside of the extracted contour line.

12. The parking assistance apparatus of claim 10, wherein the at least one circuit is configured to identify the parking lines by detecting a rectangle based on four points, at which the identified parking lines intersect each other, as the parking space.

13. The parking assistance apparatus of claim 10, wherein the at least one circuit is configured to detect the obstacle by:
calculating a histogram for the depth image in the parking space, and
detecting the obstacle in the parking space based on the calculated histogram.

14. The parking assistance apparatus of claim 10, wherein the at least one circuit is configured to detect the obstacle by:
calculating a similarity between adjacent pixels using vertical and horizontal scanning on the depth image in the parking space; and
detecting the obstacle in the parking space based on the similarity between the adjacent pixels.

15. The parking assistance apparatus of claim 10, further comprising:
a display provided inside the vehicle and configured to provide a parking availability display to a driver in response to the at least one circuit determining that parking is allowed; and
an alarm provided inside the vehicle and configured to sound a parking availability alarm to the driver in response to the at least one circuit determining that parking is allowed.

16. The parking assistance apparatus of claim 10, wherein the wide angle camera and the depth camera are integrally formed as one module.

* * * * *